Oct. 23, 1934.  L. F. NENNINGER ET AL  1,978,354
MILLING MACHINE TRANSMISSION CONTROL MECHANISM
Filed March 1, 1933  6 Sheets-Sheet 1

Inventors
LESTER F. NENNINGER
BERNARD SASSEN
By H. K. Parsons
Attorney

Oct. 23, 1934.   L. F. NENNINGER ET AL   1,978,354
MILLING MACHINE TRANSMISSION CONTROL MECHANISM
Filed March 1, 1933   6 Sheets-Sheet 3

Inventors
LESTER F. NENNINGER
BERNARD SASSEN
By A. K. Parsons
Attorney

Oct. 23, 1934.   L. F. NENNINGER ET AL   1,978,354
MILLING MACHINE TRANSMISSION CONTROL MECHANISM
Filed March 1, 1933   6 Sheets-Sheet 5

Inventors
LESTER F. NENNINGER
BERNARD SASSEN
By A.H.K. Parsons
Attorney

Oct. 23, 1934.  L. F. NENNINGER ET AL  1,978,354

MILLING MACHINE TRANSMISSION CONTROL MECHANISM

Filed March 1, 1933   6 Sheets-Sheet 6

Inventors
LESTER F. NENNINGER
BERNARD SASSEN

By AHKParsons
Attorney

Patented Oct. 23, 1934

1,978,354

UNITED STATES PATENT OFFICE 1,978,354

MILLING MACHINE TRANSMISSION CONTROL MECHANISM

Lester F. Nenninger and Bernard Sassen, Cincinnati, Ohio, assignors to The Cincinnati Milling Machine Company, Cincinnati, Ohio, a corporation of Ohio Application March 1, 1933, Serial No. 659,228

17 Claims. (Cl. 90—21)

This invention relates to milling machines and more particularly to improvements in transmission control mechanism therefor.

It is conventional practice to provide milling machines of the universal type with a transmission for effecting power movement between the work and cutter which may be so controlled as to cause said movement to take place in either direction and at either a relatively slow or feeding rate; or at a relatively fast or quick traverse rate. These transmissions are generally provided with two separate and independent elements, one of which determines the rate, and the other the direction, and neither one invades the field of operation of the other. In some types of transmissions, however, the rate is not controlled solely by a single element, but jointly by two elements. This latter type of transmission has certain advantages over the former type and the control mechanism must obviously be different.

It is an object of this invention to provide an improved electrical control mechanism for a machine tool transmission of this latter type.

Another object of this invention is to provide a control mechanism as previously mentioned, which is interlocked with the other functions of a milling machine so that the spindle will automatically stop during rapid traverse movement of the table, and automatically start upon initiation of a feed movement.

A further object of this invention is to provide an electrical control mechanism of the character described which will be capable of yielding a right hand, a left hand, or a reciprocating cycle.

Other objects and advantages of the present invention should be readily apparent by reference to the following specification considered in conjunction with the accompanying drawings illustrative of one embodiment thereof, but it will be understood that any modifications may be made in the specific structural details thereof within the scope of the appended claims without departing from or exceeding the spirit of the invention.

Referring to the drawings in which like reference numerals indicate like or similar parts.

Figure 1:
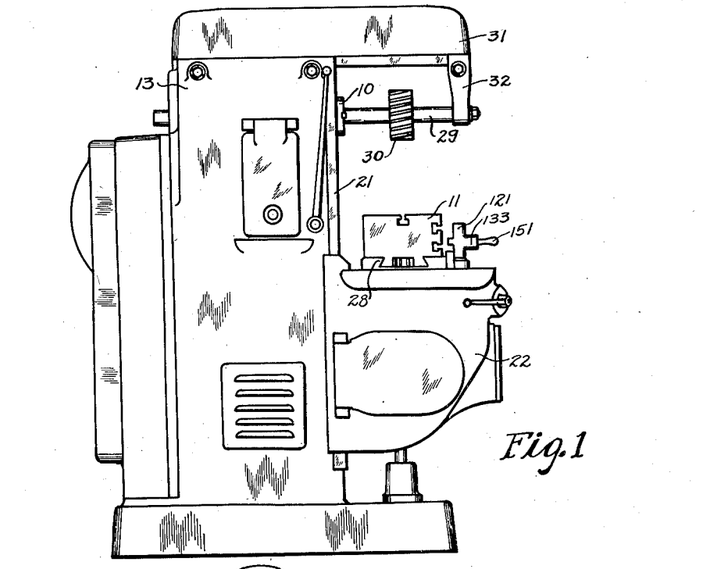
Figure 1 is a side elevation of a milling machine embodying the principles of this invention.

This invention has been illustrated in connection with a milling machine such as shown in Figure 1 having a cutter spindle 10 and a work support 11. In accordance with usual practice, these parts are supported in such a manner that relative adjustment between them in three different angular directions may be obtained.

Figures 14, 15:
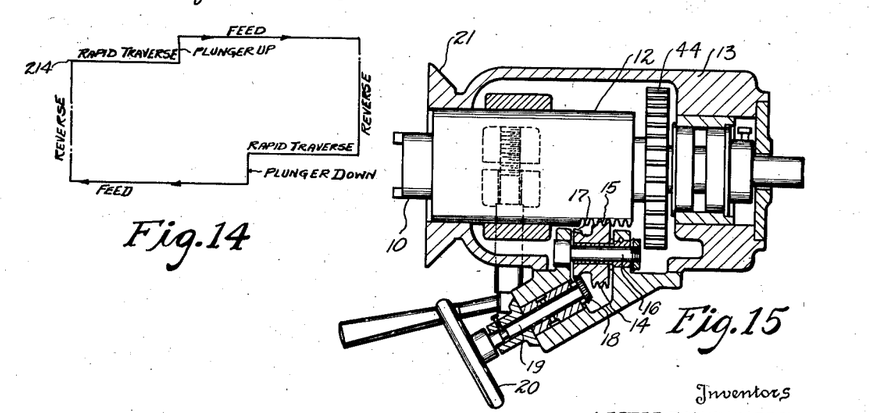
Figure 15 is a sectional view of the quill adjusting mechanism.

Thus the spindle is journaled in a quill 12, Figure 15, which is reciprocably mounted in the upper part of the column 13 thereby providing for adjustment in one direction between the cutter and work. Movement of the quill is effected by a worm wheel 14 meshing with rack teeth 15 cut in the periphery of the quill. The worm 14 is journaled on a shaft 16 and has integral therewith a bevel gear 17 meshing with the bevel gear 18 secured to shaft 19. The exterior end of this shaft is provided with a hand wheel 20 which is supported in a convenient position for ready access thereto by the operator.

Figures 4, 5, 6, 7:
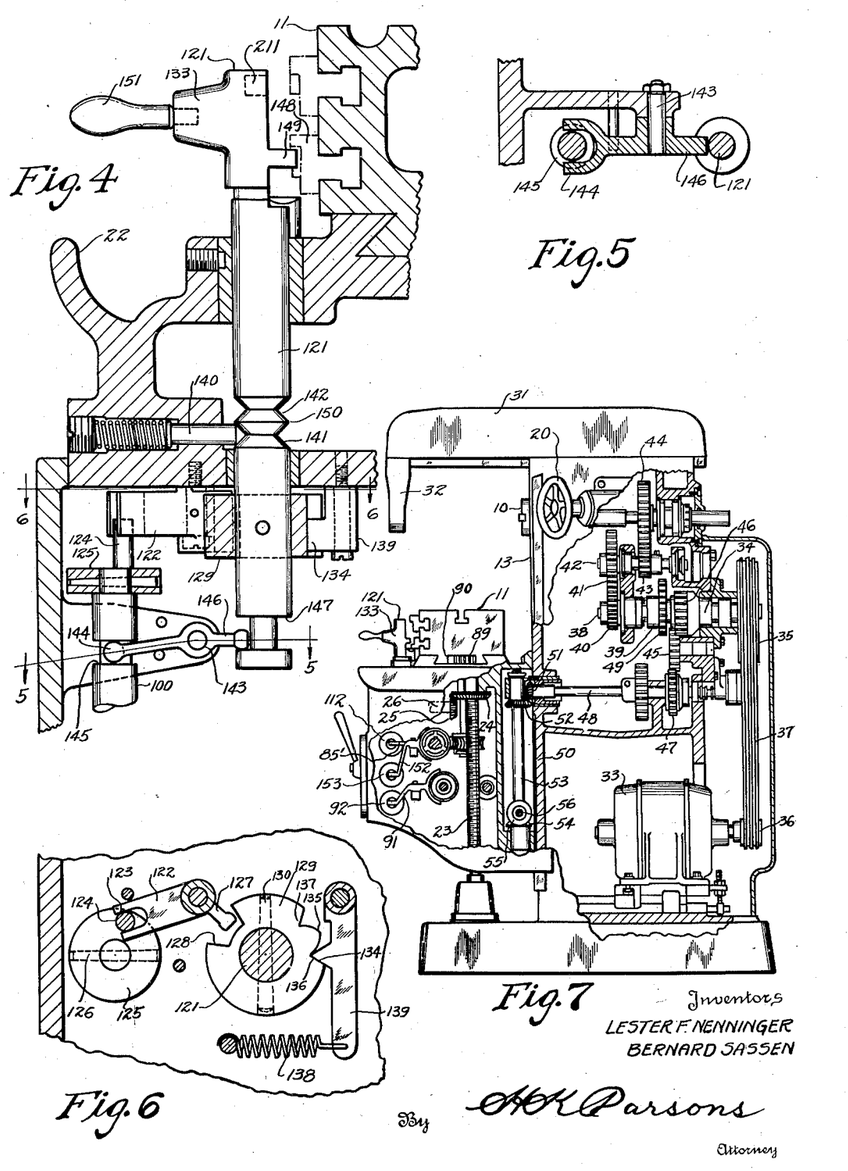
Figure 4 is a detail sectional view of the control plunger.
Figure 5 is a section on the line 5—5 of Figure 4.
Figure 6 is a section on the line 6—6 of Figure 4.
Figure 7 is a side elevation of the machine partially broken away to show the spindle transmission and other control parts.
Figure 8:
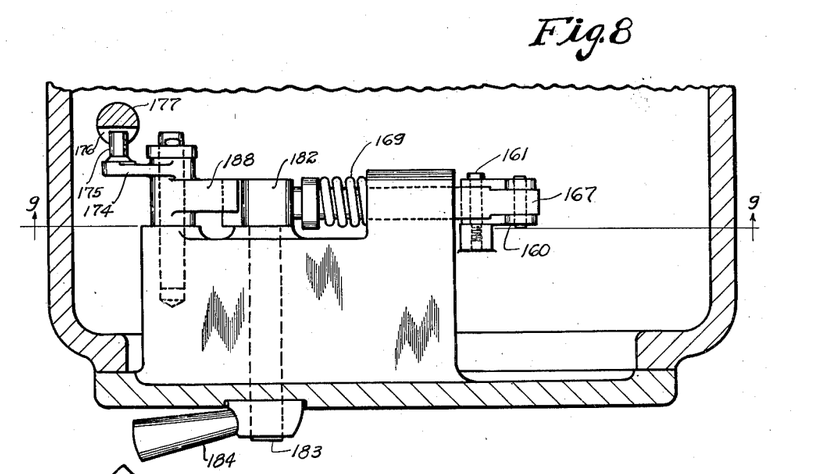
Figure 8 is a section on the line 8—8 of Figure 2.

The column 13 is provided with vertical guideways 21 on the forward face for receiving the knee 22 which in turn supports the table for vertical movement toward and from the cutter. An elevating screw 23, Figure 7, is journaled in the pedestal of the column and provided on the upper end with a bevel gear 24 meshing with a bevel pinion 25 secured to the end of the operating shaft 26. This shaft projects exteriorly at the front of the knee where it is provided with a manual control lever 27. Rotation of this handle in opposite directions will effect raising or lowering of the table toward or from the cutter thus providing adjustment in a second direction. The table 11 is reciprocably mounted in guideways 28 formed in the upper face of the knee for movement in a third direction relative to the cutter.

The cutter spindle is adapted to receive a cutter arbor 29 on which a suitable cutter 30 may be mounted; and an overarm 31 having a pendant 32, is provided for supporting the outboard end of this arbor. The cutter spindle and cutter are rotated by a variable speed transmission which is actuated by a prime mover 33 mounted in the base of the machine as more particularly shown in Figure 7. This transmission includes a main drive shaft 34 journaled in the column and coupled to the prime mover by means of suitable pulleys 35, 36 and a V-belt drive 37. The shaft 34, it will be seen, is continuously driven from the prime mover and it is adapted to be connected with a co-axial shaft 38 by means of an electrically operated friction clutch 39. A gear 40 is secured to the shaft 38 in mesh with a gear 41 on a parallel shaft 42 which shaft has a pinion 43 fixed therewith in mesh with a bull gear 44 which is keyed to the cutter spindle. The gears 40, 41 constitute change gears which may be reversed in position or replaced by other gears for the purpose of changing the rate of rotation of the spindle.

The transmission for the table is operatively coupled with the shaft 34 either exclusively of the clutch 39, or inclusive thereof so that it may be controlled by the same. To this end a gear 45 is journaled in the column which if mounted in the manner shown in Figure 7, will simultaneously engage the gear 46 continuously driven by the shaft 34 and the gear 47 fixed with the table transmission drive shaft 48. Mounted for free rotation on the shaft 34 is a gear 49 which is adapted to be coupled to shaft 34 upon engagement of the clutch 39. If the gear 45 is removed and turned around on its shaft, it will then connect gear 49 with the gear 47 and the shaft 48 will then be under the control of clutch 39.

The shaft 48 extends through the forward wall 50 of the column where it is provided with a bevel gear 51 meshing with bevel gear 52 splined on shaft 53 journaled in the knee as shown in Figure 7. The gear 52 is fixed with the column while the spline shaft 53 is journaled in the knee for movement through the gear during upward and downward movement of the knee. This provides a power transmitting connection between the column and knee during all adjustable positions of the latter. A bevel gear 54 is secured to the end of the shaft 53 in mesh with a bevel gear 55 fixed to the end of shaft 56 journaled in the lower part of the knee and having mounted thereon a spur gear 57. A second shaft 58, journaled transversely of the knee, is driven by shaft 53 through a gear 59 meshing with gear 57, the gear 59 also meshing with clutch gear 60 of the rapid traverse transmission. A second gear 61 keyed to the shaft 58 meshes with gear 62 of the feed transmission. It will at once be seen that the common drive gear 57 actuates two branch transmissions, one of which is utilized to effect rapid traverse movement of the table and the other for effecting power feed of the table.

The variable feed transmission includes a shaft 63 which extends transversely of the knee and through a side wall 64 thereof for receiving a change gear 65 keyed to the end thereof. This gear actuates a rate changer comprising the gears 66 and 67, mounted for free rotation on the projecting end of shaft 58 and the gear 68 which is keyed to a sleeve 69 surrounding the shaft 63. These gears are in serial power transmitting relationship to one another and may be inter-changed in various combinations, or other gears substituted therefore, to obtain a plurality of feed rates for the table.

A reduction gear train is provided on the interior of the knee comprising the gear 70 fixed to the sleeve 69 meshing with a gear 71 which has gear 72 integral therewith, these latter gears being mounted for free rotation on the shaft 58. The gear 72 meshes with the large gear 73 keyed to the sleeve 69. A driving member 74 is fixed on the opposite end of the sleeve 69 for rotation therewith. A pair of spaced gears 75 and 76 are mounted on the sleeve 69 and connected respectively with gear 73 and member 74 by means of over-drive friction clutches 77. Such clutches are well-known in the art and need not be further described herein. It will be noted that the sleeve 69 is unidirectionally rotated and the over-drive clutches are therefore of such construction that during power rotation of the sleeve 69 they will effect rotation of the gears 75 and 76 but should these gears be rotated at a faster rate by other means, the clutches will slip.

The clutch gear 60 is the terminal member of the rapid traverse transmission, and is mounted for free rotation on the sleeve 69 between gears 75 and 76. Since the gear 60 forms part of the rapid traverse transmission, it will be apparent that this gear will rotate at a faster rate than ever the feed gears 75 or 76 will be driven by the feed transmission. Therefore when the clutch teeth 78 are meshed with either the clutch teeth 79 of gear 75, or clutch teeth 80 of gear 76, these gears will be rotated at a faster rate than normally transmitted thereto by the overdrive clutch, in which case slippage will take place in the clutches permitting gears 75 and 76 to be rotated faster than their respective drivers. This construction constitutes an overdrive transmission whereby the parts are normally rotated at a feed rate but upon clutching with the rapid traverse member, they will be rotated at a faster rate to impart a quick traverse movement to the table.

The gear 75 meshes directly with gear 81, while the gear 76 drives gear 82 through an idler 83 resulting in gears 81 and 82 being rotated in opposite directions. The gears 81 and 82 are mounted for free rotation relative to their supporting shaft 84 which has splined thereto the direction determining clutch spool 85 which is axially shiftable to connect either of these gears to the shaft. A worm gear 86 is fixed to shaft 84 in mesh with worm wheel 87 which is keyed to the end of a shaft 88 having pinion 89 fixed to the upper end thereof in mesh with a rack 90 secured to the underside of the table. From the foregoing it should be apparent that the two shiftable clutch members determine the rate and direction of power movement of the table. It will be noted, however, that when the clutch member 85 is shifted without a corresponding shift of the clutch member 60, the direction of the work support is not only changed but also its rate. Therefore if the clutch 60 is not shifted at the same time that the clutch 85 is moved, it will be seen that the direction determining clutch invades the function of the rate determining clutch by not only changing the direction but also changing the rate.

The clutch 85 has a neutral position in which all power is disconnected from the table and therefore the shaft 84 is extended through the side of the knee where it is provided with a manually operable handle 91 by means of which the table may be manually adjusted without interference from the drive trains. A complete electrical control mechanism has been provided for shifting the clutches 60 and 85 whereby different cycles of operation may be obtained such as a continuous reciprocating cycle in which the table may be moved at feed and rapid traverse rates in both directions, and automatically reversed at the end of each stroke; a one-way right-hand feed cycle in which the table starts from the left, quick traverses and feeds toward the right, automatically reverses and quick returns to a starting position; or a one-way left-hand feed cycle in which the table starts from the right, quick traverses and then feeds toward the left, automatically reverses and quick returns to a starting position where it is automatically stopped.

The mechanism for manually or automatically controlling the position of the various clutches will now be described. A pivoted shifter fork 91 engages the shiftable gear 60 and is power operated by means of a pair of electrically actuated elements such as solenoids 92 and 93. Each solenoid has a reciprocable pole piece 94 which is normally held in a return position by a spring or other resilient means 95. When the solenoid 93 is energized, the pole piece 94 is drawn into the solenoid against the resistance of spring 95 and the outer end 96 of the pole piece engages the end 97 of the shifter fork to move the clutch gear 60 into operative engagement with the gear 76. Likewise, if the solenoid 93 is de-energized and the solenoid 92 is energized, the clutch member 60 will be moved into operative engagement with the gear 75.

Figure 3:
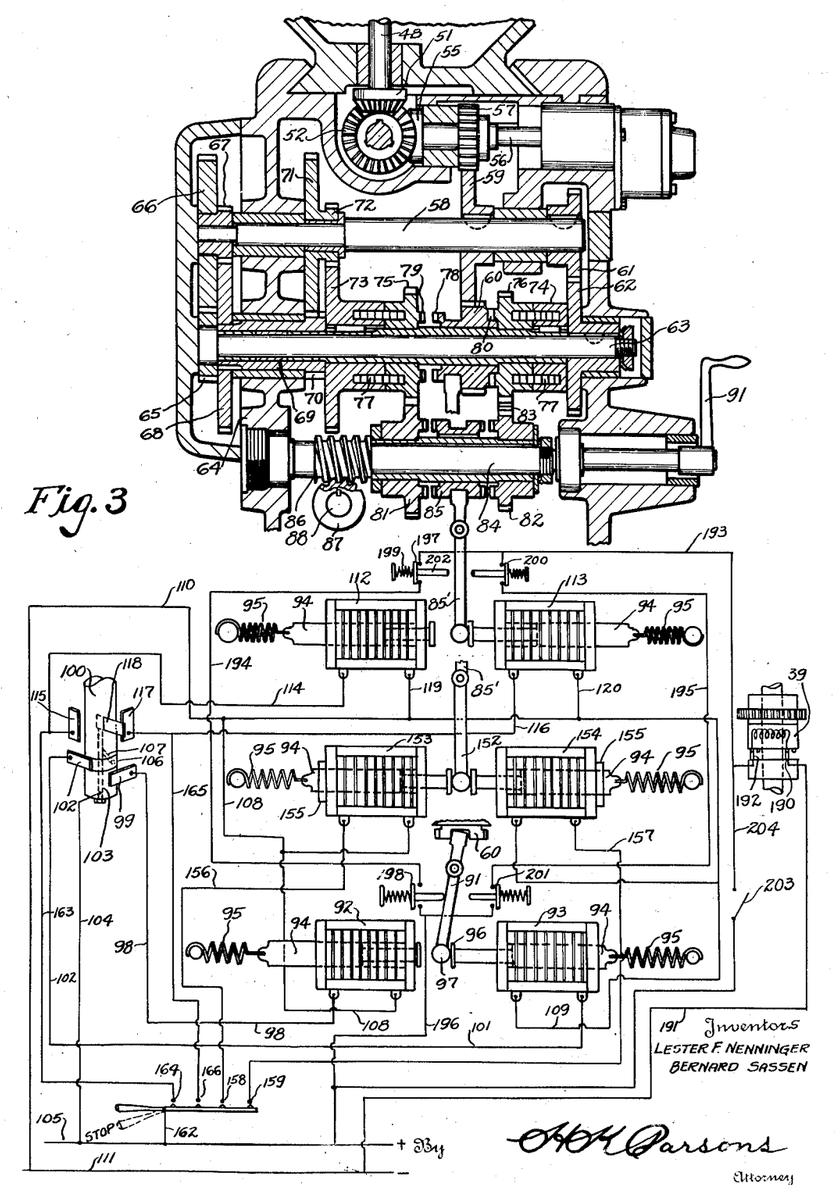
Figure 3 is an expanded view of a work support transmission showing the application of the control mechanism thereto.

The solenoid 92 is provided with a control circuit 98 which terminates at the brush 99 associated with the switch plunger 100; and the solenoid 93 is provided with a control circuit 101 terminating in a brush 102. The plunger 100 is formed of insulating material and has a metal electrical conducting core 103 which is connected at all times by conductor 104 to the positive bus 105 of the main power line. A collector ring 106 surrounds the switch plunger and is electrically connected by the copper pin 107 to the metallic core 103. When the plunger is in an upward position as shown in Figure 3 the brush 102 rides on the ring 106 and energizes solenoid 93. Downward movement of the plunger will result in the brush 99 engaging the collector ring thus effecting energization of solenoid 92. The solenoid 92 is connected by the return circuit 108 and the solenoid 93 by the return circuit 109 to the common return circuit 110, this latter circuit being connected to the minus bus 111 of a main power line.

The reversing clutch 85 is likewise provided with a pivoted shifter fork 85' shifted by a pair of solenoids 112 and 113 each having a pole piece 94 held in a normally retracted position by a spring 95. The solenoid 112 is connected by control circuit 114 to the switch point 115 and the solenoid 113 is connected by the control circuit 116 to the switch point 117, these switch points being associated with the switch plunger 100 and adapted to be alternately engaged by the radially extending switch member 118 carried by the plunger. In other words when the plunger is rotated in a counter-clockwise direction as viewed in plan view, the member 118 engages contact 117 thereby moving the clutch 85 into engagement with the clutch gear 82 and effecting movement of the table 11 in one direction; and when the plunger is rotated in a clockwise direction the member 118 engages contact 115 thereby de-energizing solenoid 113, energizing solenoid 115, and shifting clutch 85 into engagement with the clutch gear 81 to cause movement of the support 11 in the opposite direction. The solenoids 112 and 113 are connected by the return lines 119 and 120 respectively to the common return line 110 which is connected to the negative bus 111.

The switch 100 is connected for automatic operation to the trip controlled plunger 121, shown in Figure 4, by means of a bell crank 122 having a forked end 123 engaging a pin 124 mounted eccentrically in a collar 125 permanently fixed to the plunger 100 as by a tapered pin 126. The other arm 127 of the bell crank engages a circumferentially extending slot 128 formed in a collar 129 secured to plunger 121 as by the tapered pin 130. The slot 128, it will be noted, has a certain amount of lost motion with respect to the lever 127 so that upon rotation of the plunger 121 by either of the trip dogs 131 or 132 engaging the wing portion 133, sufficient rotation will be imparted to cause the detent 134 to ride over the peak 135 between the indents 136 and 137 formed in the collar 129. A spring 138 acting on the end of the pivoted lever 139 supporting the detent 134 will complete the rotary movement and thereby reverse the effect of the solenoids.

The plunger 121 is also movable axially and a spring pressed detent 140 selectively engageable with grooves 141 or 142 holds the plunger in either one of two positions. A second ball crank 143 has a forked end 144 engaging an annular groove 145 in the plunger 100 without lost motion while a second arm 146 engages an annular groove 147 in the plunger 121. This latter groove is sufficiently wide to provide a certain amount of lost motion so that upon downward movement of plunger 121 as by engagement of dog 148 with the wing 149 the lost motion will be taken up while the detent 140 rides up to the peak 150 between the grooves 141 and 142. Further movement beyond this point will cause the detent to complete the movement and thereby reverse the connections to solenoids 92 and 93. The plunger 121 is also provided with a handle 151 for manual operation of the parts.

From this description it will be seen that the switch plunger 100 has four positions capable of yielding a feed right movement, a feed left movement, a quick traverse right movement and a quick traverse left movement. It will be evident that the plunger does not have any stop position and therefore additional mechanism has been provided for manually or automatically stopping movement of the support at any time in its cycle of movement. Since the solenoids 112 and 113 are capable of yielding only two positions an additional pair of solenoids herein termed neutralizing solenoids, are provided for shifting the clutch member 85 to an intermediate or non-power transmitting position. This second pair of solenoids is mounted in the same plane as the first operating pair as shown in Figure 7, and the shifter fork 85' is provided with a second integral arm 152 adapted to be engaged simultaneously on opposite sides by the reciprocable pole pieces 94 which are mounted in solenoids 153 and 154. In this case, each pole piece has a stop nut 155 threaded thereon whereby its length of movement may be determined and controlled. These pole pieces are normally held in retracted position by springs 95 similar to the previous devices.

Figure 9:
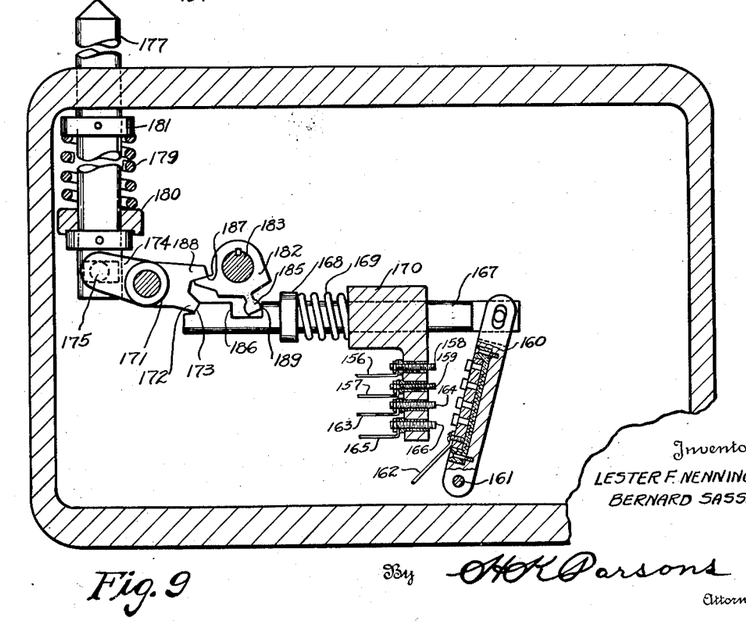
Figure 9 is an elevation of the stop control mechanism, as viewed on the line 9—9 of Figure 8.

The solenoids 153 and 154 are connected by the control circuits 156 and 157 respectively to the switch points 158 and 159. A switch lever 160 pivotally mounted at 161 as shown in Figure 9 is permanently connected by conductor 162 to the positive bus line 105. When the switch is closed it will be obvious that solenoids 153 and 154 will be energized and the clutch 85 moved to a neutral position as controlled by the positioning members 155. Since the switch plunger 100 is always connected to either contact 115 or 117 it will be apparent that this neutralizing movement would have to take place against the opposition of one of the solenoids 112 or 113. In order to balance out this opposing effect, means have also been provided for energizing both solenoids 112 and 113 at the same time that the neutralizing solenoids are energized. This is accomplished by connecting the control circuit 114 of solenoid 112 by means of conductor 163 to switch point 164 and control circuit 116 of solenoid 113 by conductor 165 to switch point 166. When the switch 160 is closed it will now be apparent that the two solenoids 112 and 113 act substantially equal and opposite and thereby do not oppose the centralizing movement effected by the solenoids 153 and 154.

Figure 2:
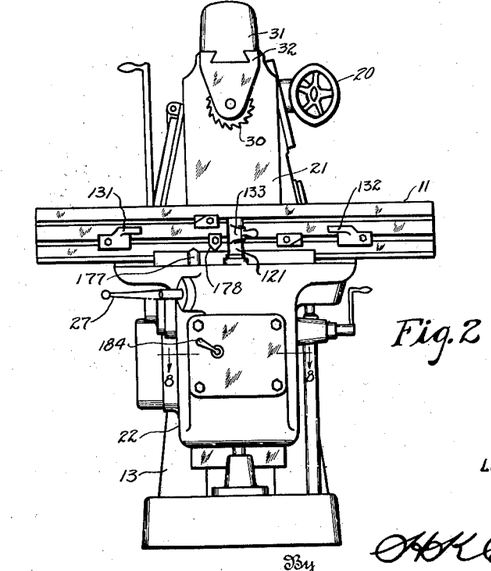
Figure 2 is a front elevation of the machine shown in Figure 1.

The switch member 160 is connected to a shifter rod 167 which has a collar 168 thereon engaging one end of a circumscribing spring 169, the other end of the spring engaging the fixed abutment 170. The spring normally acts to effect closing of the switch. The switch is held open by a pivoted bell crank 171 having a pawl-like portion 172 engaging an indent 173 formed on the end of member 167. The lever portion 174 of the bell crank has a pin 175 engaging a groove 176 formed in the lower end of a reciprocable stop plunger 177 which extends upward adjacent the front edge of the table for engagement by trip dog 178 carried by the table as more particularly shown in Figure 2. A spring 179 circumscribes the plunger 177 and is interposed between a fixed member 180 and a collar 181 pinned to the plunger for normally holding the plunger in a raised position.

Upon downward movement of the plunger 177 by the trip dog the pawl 172 will be raised, allowing the spring 169 to come into action to close the switch 160. The device is manually reset by a pivoted crank 182 keyed to operating shaft 183 which has secured to its outer end the manual control lever 184. The bell crank 182 has a ball-shaped portion 185 engaging an elongated groove 186 formed in rod 167. The groove is sufficiently long to provide a certain amount of lost motion so that upon clockwise rotation of shaft 183 as viewed in Figure 9, a projection 187 on the crank 182 may engage the lug 188 formed in the bell crank 171 and effect removal of the pawl 172 from the path of movement of rod 167 to thereby manually control the closing of switch 167. Upon counter-clockwise rotation of shaft 183 by the manual lever 184 the lug 185 will engage the end 189 of socket 186 and effect opening of the switch against the resistance of spring 169. This movement will continue until the pawl 172 drops down into engagement with the end 173 of rod 167 thereby holding the parts in the position shown in the drawings. A mechanism has thus been provided for either manually or automatically terminating movement of the table.

It is usually desirable in the operation of milling machines that the cutter stop during quick traverse movement of the work table and therefore means have been provided for automatically effecting this result during quick traverse movement of the table in either direction. The clutch 39 for determining rotation of the spindle is electrically controlled as previously mentioned and the control circuit for this clutch is so arranged that when the position of the two shiftable members 60 and 85 is such as to yield quick traverse, the control circuit for the magnetic clutch 39 is opened. As shown in Figure 3 one terminal 190 of the magnetic clutch is permanently connected by the conductor 191 to the main bus line 111. The other terminal 192 is connected to the control circuit 193 which divides into two branches 194 and 195 which are finally reconnected by the single conductor 196 to the other main bus line 105. The branch 194 has two make-and-break switches 197 and 198 in series which are normally held closed by spring 199. Likewise the circuit 195 has a pair of make-and-break switches 200 and 291 in series which are normally held closed by spring 199. Likewise the circuit 195 has a pair of make-and-break switches 200 and 201 in series which are normally held closed by springs 199.

Each one of the four switches has a plunger 202 arranged to be engaged by the pivoted shifter forks. The switches 197 and 200 are arranged upon opposite sides of the shifter fork 85', and the switches 198 and 201 are arranged upon opposite sides of shifter fork 91. If solenoids 93 and 112 are both energized at the same time a quick traverse movement of the table will follow. At the same time switches 198 and 200 will be opened thereby breaking the circuit in both branches 194 and 195 and thus de-energizing clutch 39 and stopping rotation of the spindle. Likewise if solenoids 92 and 113 are energized they will reposition the clutches to yield a quick traverse movement in the opposite direction and at the same time open switches 201 and 197. This will likewise break the circuit in both branch lines 194 and 195 thereby de-energizing the clutch and stopping the spindle. If, however, either pair of solenoids 112, 92 or 113, 93 are energized, only the switches in one branch will be opened, the switches in the other branch remaining closed and thereby maintaining rotation of the cutter spindle. It will thus be seen that without any attention on the part of the operator, control circuits which are of a relay nature determine rotation or non-rotation of the spindle. An auxiliary switch 203 may be provided in a by-pass circuit 204 which is connected directly to the main bus line for manual control of the cutter independent of the made-and-break switches.

Figure 12:
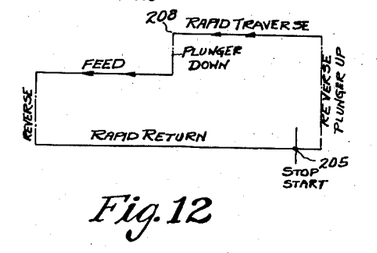
Figures 12, 13 and 14 are diagrammatic views illustrating some of the possible cycles of operation.
Figure 12A:
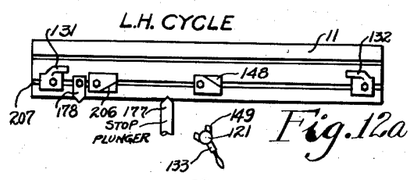
Figures 12A, 13A and 14A are views showing the position of the control dogs to effect the cycles shown in Figures 12, 13, and 14 respectively.

The arrangement of the control dogs for effecting the various cycles of operation will now be described. In Figure 12A the dogs are positioned for effecting the left-hand one-way cycle shown diagrammatically in Figure 12. Assuming the point 205 as the starting point, the operator will throw the control lever 184 to the running position and the table will begin to move toward the right a sufficient amount for the reverse dog 131 to engage and rotate the plunger 133 in a counter-clockwise direction as viewed in Figure 12A, thereby causing the table to move toward the left. Since mere rotation of the control plunger 133 not only changes direction but also changes rate, the table will start to move toward the left at a feed rate. In order to move the work quickly up to the cutter, a plunger elevating dog 206 is positioned in the lower T-slot 207 for engagement with the lower projecting lug 149 on plunger 121. The table will then move at a rapid traverse rate to an appropriate point, such as 208, at which time the dog 148 will engage the upper side of lug 149 and thereby lower the plunger to change the rate from rapid traverse to feed. The feeding movement will then continue until the reverse dog 132 engages the wing 133 of plunger 121 and rotates the same in a clockwise direction. This will not only change the direction but also change the rate to a rapid traverse. Rotation of the plunger will also withdraw lug 149 from the path of its control dogs so that there will be no interference therefrom until the return movement is completed. Stoppage of the table at a point 205 is effected by stop dog 178 engaging the stop plunger 177 to force the same downward, and cause the spring 169 as shown in Figure 9 to close the control switch and neutralize clutch 85. The cycle may obviously be repeated as many times as desired.

Figure 13:
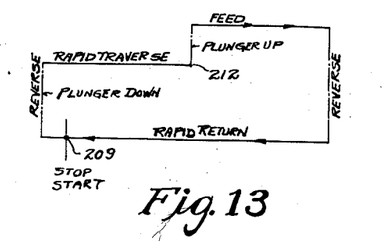
Figure 13A:
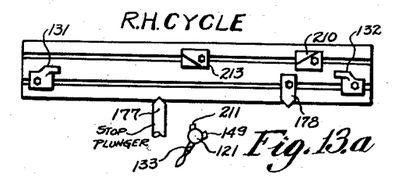

The set up for a right hand cycle is illustrated in Figures 13 and 13A, the point 209 representing the starting point. Here again the operator will throw lever 184 to start the machine and the table will begin to move at a rapid traverse rate toward the left a sufficient amount for the reverse dog 132 to rotate the plunger 121 in a clockwise manner to change both the rate and direction of movement. As previously explained, the operator may do this even although the stop dog interferes with the upward movement of the stop plunger. Since the rate has been changed, it is necessary to provide a control dog 210 for lowering the plunger 121. Since the plunger 131 is now in a reverse position to that shown in Figure 12A, the lower lug 211 carried by the plunger is now projected for engagement by dog 210 to lower the plunger. The table will now move at a rapid traverse rate. This movement will continue until a suitable point such as 212 is reached, at which time dog 213 will raise lug 211 and elevate the plunger thereby causing the table to feed. The feed movement will continue until reverse dog 131 rotates plunger 121 counter-clockwise at which time both the rate and direction will be changed and the table will rapidly return toward the left until stop dog 178 depresses plunger 177.

Figure 14A:
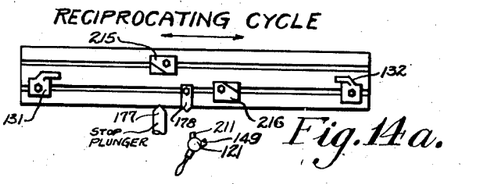

The set up of the dogs for a reciprocating cycle is illustrated in Figures 14 and 14A and since this is a continuous cycle any starting point, such as 214, may be assumed. If the table is started at this point it will move toward the right at a rapid traverse rate and in order for it to do this the control plunger 121 must be down and it must be rotated to the position shown. The table will continue toward the right until dog 215 engages the upper lug 211 to elevate the plunger. This will change the rate of movement to feed which will continue until the reverse dog 131 rotates plunger 121. This will reverse both the rate and direction of movement, the table then moving toward the left at a rapid traverse rate. It will also be remembered that rotation of the plunger caused withdrawal of the lug 211 and projection of the lug 149. Therefore, in order to change the rapid traverse to a feed rate, a control dog 216 must be positioned in the lower T-slot for depressing the plunger. The table will now move at a feed rate with the plunger lowered until the reverse dog 131 rotates the plunger 121 to change both the rate and direction of movement. It will thus be seen that this cycle is continuous. If so desired, a stop dog 178 may be positioned for stopping the table just before it engages the respective work piece so as to insure that the work is securely clamped.

Figure 10:
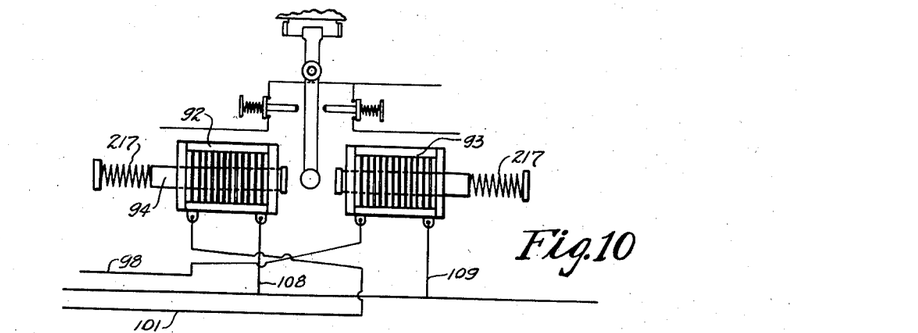
Figure 10 is a modified form of clutch operating mechanism.

The electrical solenoids shown in Figure 3 operated upon the principle that when the solenoid is de-energized, the pole piece is automatically withdrawn by a spring and the shifting movement was effected by energizing the desired solenoid. It may, however, be desirable to reverse these functions, that is, utilize a spring for effecting the actual shifting movement and energize the solenoid to withdraw the pole piece from the path of movement of the shifter arm. A hook-up for such construction is shown in Figure 10 in connection with one pair of operating solenoids, such as 92 and 93, which are provided with springs 217 for normally maintaining the pole pieces 94 in a projected position. Each solenoid is provided with the return lines 108 and 109 as previously explained, but the control circuits 98 and 101 are reversely connected, the said control circuit 98 being now connected to solenoid 93 while the control circuit 101 is connected to solenoid 92.

Figure 11:
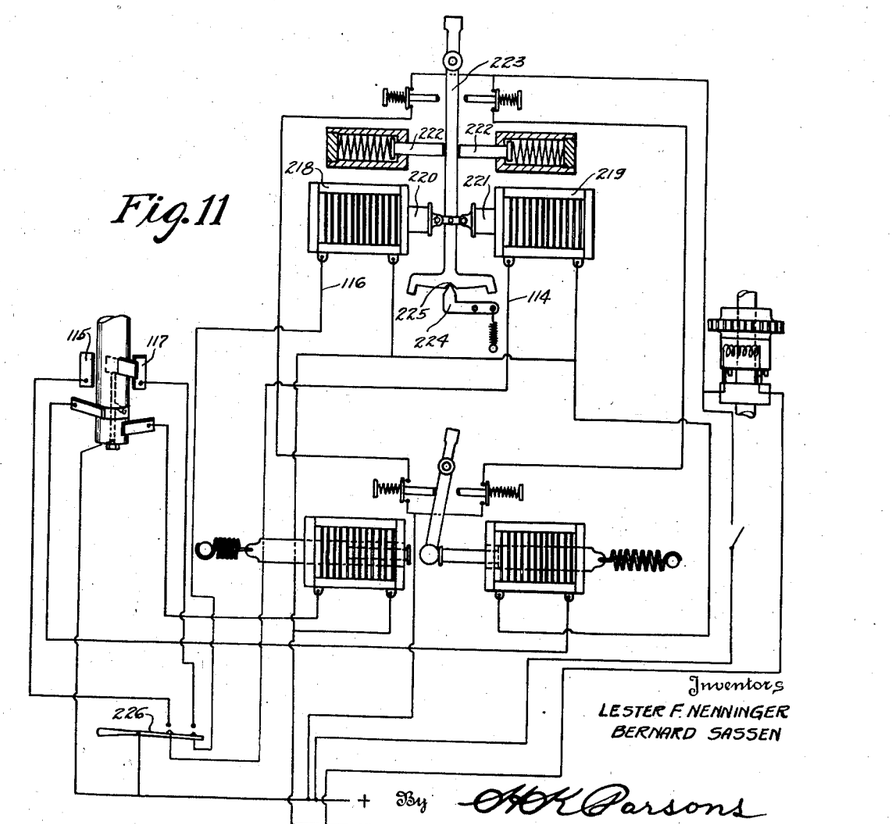
Figure 11 is a modified form of the control mechanism as shown in Figure 3.

An additional modification of the invention is illustrated in Figure 11 and deals more particularly with means for moving clutch 85 to its three positions. The method of operating the solenoids 218 and 219 is somewhat similar to that described in connection with Figure 10. In other words the control circuit 116 is connected to solenoid 218 and the control circuit 114 is connected to solenoid 219. It will be recalled in Figure 3 that energization of circuit 116 caused the clutch 85 to engage the clutch gear 82 and so in this case energization of circuit 116 and its solenoid 218 will retract pole piece 220 to effect the same result. In a similar manner energization of circuit 114 will cause the solenoid 219 to draw in the pole piece 221 and effect a reverse movement of the table. When each of these circuits are disconnected, however, a pair of spring pressed plungers 222 will act on opposite sides of the pivoted shifter fork 223 to move the same to a central or neutral position. To assist in this centralizing movement the shifter 223 is provided with a spring pressed detent 224 adapted to engage a notch 225 formed in the end of the shifter member. In this case the control circuits 116 and 114 are lead through a switch 226 which is pivotally mounted and operated similar to the switch 160 shown in Figure 9. In other words, when the switch is open the table will stop and when the switch is closed the table will be running.

It will thus be seen that an improved and simplified form of control mechanism has been provided for a milling machine transmission which is comprised of a very few number of parts which may be easily constructed and installed, and in which not only may any cycle of operation be produced but in combination with an automatic spindle stop during any rapid traverse movement.

What is claimed is:

1. In a milling machine having a support, a cutter supporting member and a work supporting member mounted on said support for movement relative to one another, the combination of a transmission for effecting said relative movement selectively at feed or quick traverse rates, said transmission including a pair of shiftable elements jointly determinative of said rate, one of said members also determining the direction of said movement; and a control mechanism for automatically positioning said members including a first pair of electro-actuated units for determining the position of one member, a second pair of electro-actuated units for determining the position of the other member, individual control circuits for each unit, a trip controlled switch member, said member being axially or rotatably movable, and means coupling the circuits to the switch member whereby movement of the switch member in one path will selectively energize one pair of circuits and movement in the other path will control energization of the other pair of circuits.

2. In a milling machine having a support, a cutter supporting member and a work supporting member mounted on said support for movement relative to one another, the combination of a transmission for effecting said relative movement selectively at feed or quick traverse rates, said transmission including a pair of shiftable elements jointly determinative of said rate, one of said members also determining the direction of said movement; and a control mechanism for automatically positioning said members including a first pair of electro-actuated units for determining the position of one member, a second pair of electro-actuated units for determining the position of the other member, individual control circuits for each of said units, a trip controlled switch member, said member being axially or rotatably movable, means coupling the circuits to the switch member whereby movement in one path will selectively energize one pair of circuits, and movement in the other path will selectively energize the other pair of circuits, said means including axially spaced brushes attached to the terminals for one pair of circuits, a collector ring secured to the switch member for selective engagement with said brushes, and a radially extending switch element for selective coupling with the terminals of the other pair of circuits.

3. A milling machine comprising a column, a cutter spindle journaled in the column, a work support carried by the column for movement transversely of the spindle, a transmission for effecting rotation of the spindle and movement of the work support including a prime mover, a first branch variable speed transmission extending to the spindle, a clutch for coupling the branch transmission to the prime mover, a second branch transmission extending to the table, means to couple said second branch to the prime mover exclusive of said clutch, said second branch transmission including a pair of continuously oppositely rotated members, means for rotating one of said members at a fast rate and the other at a slow rate, an interposed shiftable member for selectively coupling the members to the work support for movement in one direction at a feed rate or in the other direction at a rapid traverse rate, individual electrical solenoids for moving the shiftable member to each position, a rotatable control plunger, a first trip dog carried by the table for oscillating the plunger and effect deenergization of one solenoid and energization of the other solenoid whereby a slow feed rate in one direction will be automatically changed to a fast movement in the opposite direction, and a second trip dog carried by the table for reversely oscillating the plunger and changing the fast rate in one direction to a slow rate in the opposite direction.

4. In a transmission and control mechanism for a milling machine having a cutter spindle and a work support movable transversely thereof, the combination of parallel transmission trains, a prime mover, means coupled therewith for actuating one train at a feed rate and the other train at a quick traverse rate, a first shiftable member for determining the rates of said trains, a second shiftable member for selectively coupling said trains to the work support, a first pair of solenoids for shifting the first movable member, a second pair of solenoids for shifting the second movable member, pivoted shifter forks for the members, an axially movable plunger mounted in each solenoid for actuating the forks, resilient means for maintaining each plunger retracted, and a common control switch for selectively energizing said solenoids to effect movement of the work support in either direction and at either a feed or a rapid traverse rate.

5. In a transmission and control mechanism for a milling machine having a cutter spindle and a work support movable transversely thereof, the combination of parallel transmission trains, a prime mover, means driven thereby for simultaneously operating one train at a feed rate and the other train at a quick traverse rate, a first shiftable member for determining the rates of the respective trains, a second shiftable member for selectively coupling said trains to the work support, a first pair of solenoids for shifting the first movable member, a second pair of solenoids for shifting the second movable member, pivoted shifter forks associated with each member, plungers mounted in the solenoids for moving the forks, resilient means for retracting plungers, an oscillatable and rotatable switch member, a pair of main power lines, means to connect the switch to one power line, means to connect one end of each solenoid to the other power line, individual control circuits connecting each solenoid to the switch member, said switch member being oscillatable to energize selectively one pair of circuits and reciprocable to energize selectively the other pair of circuits.

6. In a transmission and control mechanism for a milling machine having a cutter spindle and a work support movable transversely thereof, the combination of parallel transmission trains, a prime mover, means driven thereby for simultaneously operating one train at a feed rate and the other train at a quick traverse rate, a first shiftable member for determining the train to be operated at a fast rate, a second shiftable member for selectively coupling said trains to the work support, a first pair of solenoids for shifting the first movable member, a second pair of solenoids for shifting the second movable member, pivoted shifter forks associated with each member, shifter fork actuating members mounted in each solenoid, resilient means for maintaining each plunger in a return position, an oscillatable and rotatable switch member, a pair of main power lines, means to connect the switch to one power line, means to connect one end of each solenoid to the other power line, individual control circuits connecting each solenoid to the switch member, said switch member being oscillatable to energize selectively the other pair of circuits, trip dogs carried by the table for effecting reciprocation of the plunger, additional trip dogs carried by the table for axially shifting the plunger, and detent mechanism for maintaining the plunger in any of its various positions.

7. In a transmission and control mechanism for a milling machine having a cutter spindle and a work support movable transversely thereof, the combination of parallel transmission trains, a prime mover, means rotated thereby for actuating one train at a feed rate and the other train at a quick traverse rate, the final members of said trains rotating in opposite directions, a first shiftable member, for determining the train to be rotated at a feed rate, a second shiftable member for selectively coupling said trains to the work support, a first pair of solenoids for shifting the first movable member, a second pair of solenoids for shifting the second movable member, an oscillatable and rotatable switch member, a pair of main power lines, means to connect the switch to one power line, means to connect one end of each solenoid to the other power line, individual control circuits connecting each solenoid to the switch member, said switch member being oscillatable to selectively energize one pair of circuits and reciprocable to selectively energize the other pair of circuits, trip dogs carried by the table for oscillating the plunger, additional trip dogs carried by the table for axially shifting the plunger, detent mechanism for maintaining the plunger in any of its respective positions, and manually operable means associated with the trip plunger for controlling said circuits independent of said trip dogs.

8. In a milling machine having a column, a cutter spindle journaled in the column and a work support movable transversely of the spindle, a transmission for the spindle including a prime mover, a clutch, and a change speed mechanism in the order recited; means for effecting movement of the table including a branch train, means to selectively couple the train to the prime mover, either inclusive or exclusive of said clutch, said branch including a portion operable to yield a feed rate and a portion operable to yield a rapid traverse rate, a pair of shiftable elements for jointly determining the final rate imparted by said train, one of said elements also determining the direction of movement imparted by the train, an electrical control circuit for determining the position of said elements, a relay control circuit for the spindle clutch including relay switches connected in series, and associated with said shiftable elements for operation thereby whereby movement of said elements to positions yielding quick traverse movement of the work support will effect de-energization of the spindle transmission control clutch.

9. In a milling machine having a rotatable cutter spindle and a work support movable transversely of the spindle, the combination with transmission means for effecting power movement of said parts, said transmission including a pair of shiftable elements for jointly determining between feed and quick traverse movement of the work support, and a magnetic clutch for determining rotation of the spindle, of means for terminating rotation of the spindle during quick traverse movement of the work support including an electrical control circuit for the spindle clutch, said control circuit including branch parallel lines, each line including serially connected switches mounted in operative relation to the shiftable members, said switches being so arranged that upon movement of the shiftable members to a feed position, the switches in one of said circuits will be closed to maintain rotation of the spindle, but upon movement of the control members to a position yielding a rapid traverse movement, one switch in each circuit will be opened to thereby stop rotation of the spindle.

10. In a milling machine having a support, a cutter spindle journalled in the support and a table movable transversely of the cutter spindle, the combination of transmission means for effecting translation of the table including a pair of opposite rotating members, an intervening clutch member for selectively connecting either member to the table for effecting movement thereof, a pair of spaced power energizable units operatively connected to said clutch, a two-position control member for selectively energizing said units, means carried by the table for automatically changing the position of said control member to effect shifting of the clutch, a second pair of power energizable units adapted to be simultaneously energized to move said clutch to a non-power transmitting position, an auxiliary power control member for said last named pair of units, and trip means carried by the table for actuating said last named control member.

11. A milling machine having a column, a cutter spindle journaled in the column, a work support movable transversely of the spindle, transmission means for effecting said movement including a direction determining clutch, a pair of electrical solenoids for moving the clutch to either extreme position to determine the direction of movement of the table, a selector switch mounted adjacent the table, trip dogs carried by the table for operating said switch and thereby automatically reversing the direction of movement of the table, a second pair of solenoids for moving said clutch to an intermediate or non-power transmitting position, an auxiliary control switch, means coupling the second pair of solenoids to the auxiliary control switch for joint operation, and trip means carried by the table effective on said auxiliary switch to stop the movement of the table.

12. In a milling machine having a column, a cutter spindle journaled in the column and a work table movable transversely of the spindle, the combination of transmission and control mechanism for the table including a direction determining clutch having a non-power transmitting position and a power transmitting position on either side thereof, a first pair of solenoids selectively energizable for moving the clutch to either power transmitting position, a second pair of electrical solenoids for moving said clutch from either power transmitting position to a neutral position, a first control device for the first pair of solenoids, trip means carried by the table and operable on said device for automatically changing the direction of table movement, and a second control device automatically actuable by the table for energizing the second pair of solenoids to stop the table movement, said device also being operative to simultaneously energize the first pair of solenoids thereby neutralizing their effect during operation of the second pair of solenoids.

13. A milling machine comprising a column, a cutter spindle and a work support mounted in the column, means for effecting rotation of the spindle including a control clutch therefor, electrically operated means for determining the effect of said clutch, a control circuit therefor, transmission means for effecting movement of the work support including a plurality of clutches movable to various positions for determining the rate and direction of said movement, means operable by said work support control clutches when moved to a quick traverse position to open said control circuit to stop rotation of the spindle, and an auxiliary control circuit for effecting operation of said spindle clutch independent of the position of said work support control clutches.

14. In a milling machine having a support, a relatively movable tool member and work supporting member carried thereby, the combination of power transmission means for effecting said relative movement in opposite directions and selectively at feed or quick traverse rates, said means including a first shiftable element for changing the direction of movement, a second shiftable element adapted to be moved while the first element remains in a given position to change the rate of said movement, a control mechanism for automatically positioning said elements including a first pair of electro-actuated units for determining the position of one element, a second pair of electro-actuated units for determining the position of the second element, individual electrical control circuits for each element and a switch control member differently movable for individually energizing said circuits.

15. A milling machine having a column, a tool spindle mounted in the column, a knee carried by the column for adjustment toward and from the spindle, a table reciprocably mounted on the knee for movement transversely of the spindle, transmission means for effecting actuation of the parts including a prime mover, a spindle transmission, an electrically actuated clutch mounted in the column for coupling the spindle transmission to the prime mover, a table transmission mounted in the knee, motion transmitting means coupling the table transmission to the prime mover for continuous actuation thereby, said table transmission including a plurality of shiftable elements for determining the rate and direction of table movement, an electrical control circuit in the knee for determining the position of said elements, said control circuit including interlock control switches mounted in the knee, and circuit means connecting said interlock switches to the clutch in the column whereby rotation of the spindle may be determined in accordance with the rate of table movement.

16. A milling machine having a column, a tool spindle mounted in the column, a knee carried by the column for adjustment toward and from the spindle, a table reciprocably mounted on the knee for movement transversely of the spindle, transmission means for effecting actuation of the parts including a prime mover, a spindle transmission, an electrically actuated clutch mounted in the column for coupling the spindle transmission to the prime mover, a table transmission mounted in the knee, motion transmitting means coupling the table transmission to the prime mover for continuous actuation thereby, said table transmission including a plurality of shiftable elements for determining the rate and direction of table movement, an electrical control circuit in the knee for determining the position of said elements, said control circuit including interlock control switches mounted in the knee, circuit means connecting said interlock switches to the clutch in the column whereby rotation of the spindle may be determined in accordance with the rate of table movement, and an auxiliary control switch mounted on the column for rendering said interlock control switches ineffective whereby rotation of the spindle may be controlled independent of the rate of table movement.

17. In a milling machine having a column, a cutter spindle journaled in the column and a work table movable transversely of the spindle, the combination of transmission and control mechanism for the table including a direction determining clutch having a non-power transmitting position and a power transmitting position on either side thereof, a first pair of solenoids selectively energizable for moving the clutch to either power transmitting position, a second pair of electrical solenoids for moving said clutch from either of said power transmitting positions to its non-power transmitting position, a reverse control switch for the first pair of solenoids, trip means carried by the table for power actuating said switch to change the direction of table movement, a second control switch connectible with the second pair of solenoids, said switch also being simultaneously connectible to the first pair of solenoids, trip means carried by the table for automatically closing said second switch to stop the table movement, manually operable means for reopening said switch and lost motion means for permitting said reopening of the switch although normally prevented by said trip means.

LESTER F. NENNINGER.
BERNARD SASSEN.